United States Patent
Otsuka et al.

(10) Patent No.: US 7,423,774 B2
(45) Date of Patent: Sep. 9, 2008

(54) COMMUNICATION SYSTEM

(75) Inventors: Shuji Otsuka, Nagoya (JP); Satoshi Matsushita, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 361 days.

(21) Appl. No.: 11/068,906

(22) Filed: Mar. 2, 2005

(65) Prior Publication Data
US 2005/0146752 A1 Jul. 7, 2005

Related U.S. Application Data

(63) Continuation of application No. 09/234,485, filed on Jan. 21, 1999, now Pat. No. 6,879,411.

(51) Int. Cl.
*G06F 15/00* (2006.01)
*H04M 11/00* (2006.01)

(52) U.S. Cl. .................................. 358/1.15; 379/93.23

(58) Field of Classification Search ................ 358/1.15, 358/403, 404, 400, 402, 434, 440; 379/93.23, 379/100.01; 709/204, 206, 218–219
See application file for complete search history.

(56) References Cited

U.S. PATENT DOCUMENTS

| | | | |
|---|---|---|---|
| 5,461,488 A | 10/1995 | Witek | |
| 5,689,642 A | 11/1997 | Harkins et al. | |
| 5,798,848 A | 8/1998 | Ouchi | |
| 5,862,202 A | 1/1999 | Bashoura et al. | |
| 5,872,845 A | 2/1999 | Feder | |
| 6,005,677 A | 12/1999 | Suzuki | |
| 6,009,153 A | 12/1999 | Haughton et al. | |
| 6,157,463 A | 12/2000 | Kitagawa | |
| 6,157,706 A | 12/2000 | Rachelson | |
| 6,559,979 B1 | 5/2003 | Ryan | |
| 6,879,411 B1 * | 4/2005 | Otsuka et al. | ............... 358/1.15 |

FOREIGN PATENT DOCUMENTS

| | | |
|---|---|---|
| JP | A-7-321997 | 12/1995 |
| JP | A-9-163062 | 6/1997 |
| JP | A-9-247335 | 9/1997 |
| JP | A 10-032601 | 2/1998 |
| WO | WO 97/10668 | 3/1997 |

* cited by examiner

*Primary Examiner*—David Moore
*Assistant Examiner*—Saeid Ebrahimi
(74) *Attorney, Agent, or Firm*—Oliff & Berridge, PLC

(57) ABSTRACT

A communication system includes a communication terminal, a computer transmitting addressee identification information to the communication terminal, a computer-side fetching unit fetching the addressee identification information from a computer-side store unit, a computer-side output unit that outputs the fetched addressee identification information to the terminal in case of communication, a retrieval information input unit located in the terminal and operated for input of retrieval information relating the addressee identification information, an instruction unit located in the terminal to instruct the computer to retrieve the addressee identification information, the instruction unit instructing the computer to fetch the addressee identification information based on the retrieval information supplied by an operator, and a terminal side display that displays the outputted data so that the desired addressee identification information is selected at the terminal side.

25 Claims, 12 Drawing Sheets

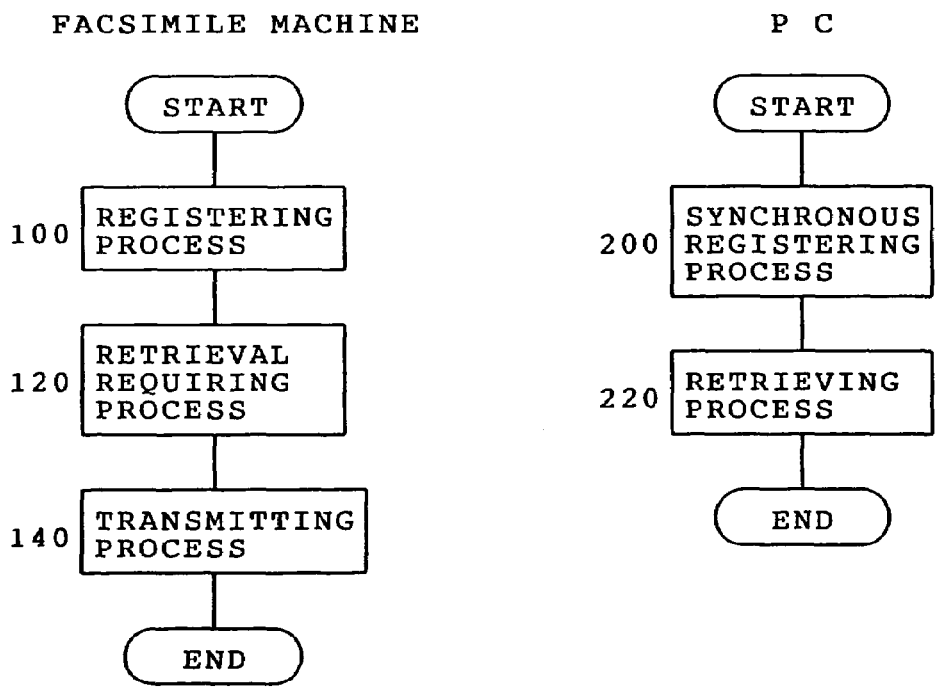

COMMUNICATION SYSTEM

This is a Continuation of U.S. patent application Ser. No. 09/234,485 filed Jan. 21, 1999, now U.S. Pat No. 6,879, 411. The entire disclosure of the prior application is hereby incorporated by reference herein in its entirety.

BACKGROUND OF THE INVENTION

1. Field of the Invention

This invention relates to a facsimile system including a facsimile machine and a computer for controlling names of addressees, facsimile numbers, etc.

2. Description of the Related Art

In conventional facsimile machines, data of names of addressees to whom image data read from an original or manuscript and corresponding facsimile numbers as selected registration numbers (such as abbreviated numbers) is stored in a memory. When a registration number of an addressee is input upon transmission of image data of the original, the name of address and the facsimile number both corresponding to the input registration number are read and displayed on a liquid-crystal display section. When a user confirms the displayed contents and then depresses a transmission button, the original is read and the image data read from the original is transmitted to the displayed addressee.

In the above-described facsimile machines, however, keys and abbreviated dialing buttons depressed for input of a facsimile number also serve as character keys. Further, every one key is allotted to a plurality of characters so that characters can be input by use of a small number of keys. Moreover, the individual keys are small and the liquid-crystal display section displaying the input characters also has a small display area. The above-mentioned keys etc. need to be operated so that the characters are input when the names of addresses are registered. This registering work takes much time as compared with the case where a keyboard equipped in a computer or word processor is operated.

To solve the above-described problem, the prior art has proposed an arrangement in which a computer is connected to a facsimile machine. In this arrangement, data of information about the addressee such as the names of addressees and corresponding facsimile numbers is input into the computer. Thereafter, the data of information about the addressees is transferred to the facsimile machine and stored in a suitable memory. In the proposed arrangement, however, in the case where the user makes reference to the data of information about the addressee when the original is to be transmitted by the facsimile machine, the user needs to move from a location where the facsimile machine is equipped to a location where the computer is equipped, so that the user operates the computer in order that the data of information about the addressee may be displayed. Thus, the user cannot make reference to the data of information about the addressees at the facsimile machine side. This results in a troublesome operation.

SUMMARY OF THE INVENTION

Therefore, an object of the present invention is to provide a facsimile system in which the data of information about the addressees stored at the computer side can be referred to at the facsimile machine side.

The present invention relates a communication system comprising a communication terminal having a function of specifying an addressee from addressee identification information to communicate with the specified addressee; a computer transmitting addressee identification information to the communication terminal; a computer-side store unit provided at a computer side that stores the addressee identification information; a computer-side fetching unit provided at the computer side that fetches the addressee identification information from the computer-side store unit; a computer-side output unit that outputs the fetched addressee identification information to the communication terminal in case of communication so that the communication is executed according to a piece of addressee identification information selected from the fetched addressee identification information; a retrieval information input unit provided in the communication terminal and operated by an operator for input of retrieval information relating the addressee identification information; an instruction unit provided in the communication terminal so as to instruct the computer at the communication terminal side to retrieve via the computer-side fetching unit the addressee identification information stored in the computer-side store unit, the instruction unit instructing the computer to fetch the addressee identification information based on the retrieval information supplied by an operator; and a terminal side display that displays the addressee identification information outputted by the computer-side output unit so that the piece of addressee identification information is selected at the communication terminal side.

According to the above-described communication system, the computer-side fetching unit refers to and fetches the addressee identification information stored in the computer-side store unit when the instruction unit gives the computer an instruction to refer to the addressee identification information. As a result, for example, a facsimile machine can refer to the addressee identification information. Accordingly, when addressee identification information which cannot be stored at the facsimile machine side is stored in the computer-side store unit, the addressee identification information stored in the computer-side store unit can freely be referred to by the instruction unit at the facsimile machine side. Consequently, a quantity of substantially storable addressee identification information can be increased to a large degree.

The invention further provides a communication system comprising a communication terminal having a function of specifying an addressee from addressee identification information to communicate with the specified addressee; a computer transmitting addressee identification information to the communication terminal; a computer-side store unit provided at a computer side that stores the addressee identification information; a computer-side fetching unit provided at the computer side that fetches the addressee identification information from the computer-side store unit; a computer-side output unit that outputs the fetched addressee identification information to the communication terminal in case of registration in the communication terminal of the addressee identification information used for communication so that the communication is executed according to a piece of addressee identification information selected from the fetched addressee identification information; a retrieval information input unit operated by an operator for input of retrieval information relating the addressee identification information; an instruction unit provided in the communication terminal so as to instruct the computer at the communication terminal side to retrieve via the computer-side fetching unit the addressee identification information stored in the computer-side store unit, the instruction unit instructing the computer to fetch the addressee identification information based on the retrieval information supplied by an operator; and a terminal side display that displays the addressee identification information outputted by the computer-side output unit so that the piece of addressee identification information is selected at the communication terminal side, wherein the communication terminal includes a terminal-side input unit provided so that the addressee identification information output is received in the communication terminal, and a terminal-side store unit that stores the addressee identification information supplied to the terminal-side input unit.

In another preferred form, the facsimile machine includes facsimile-side registering means for registering the data of addressee identification information in the facsimile-side storage means and facsimile-side output means for outputting the data of addressee identification information registered in the facsimile-side storage means by the facsimile-side registering means. In this preferred form, the computer includes computer-side input means for receiving the data of addressee identification information output from the facsimile-side storage means by the facsimile-side output means, and the computer-side storage means stores the data of addressee identification information received by the computer-side input means.

In further another preferred form, the facsimile machine is capable of executing facsimile transmission via an internet to an addressee, and the facsimile machine includes reading means for reading data of address information registered on the basis of an electronic mail application program which is already in operation and designating means for designating the data of address information read by the reading means as data of address information for the facsimile transmission via the internet. In this arrangement, the facsimile machine preferably includes address information storage means for storing the data of address information designated by the designating means as an addressee address for the facsimile transmission via the internet and address selecting means for selecting a desired address from the address information storage means.

BRIEF DESCRIPTION OF THE DRAWINGS

Other objects, features and advantages of the present invention will become clear upon reviewing the following description of the preferred embodiments made with reference to the accompanying drawings, in which:

FIG. 6 illustrates the contents of a telephone directory 28c;

FIGS. 7A and 7B are flowcharts showing the contents of main processes carried out by a CPUs 30 and 25 respectively;

DETAILED DESCRIPTION OF THE PREFERRED EMBODIMENTS

Figure 1:
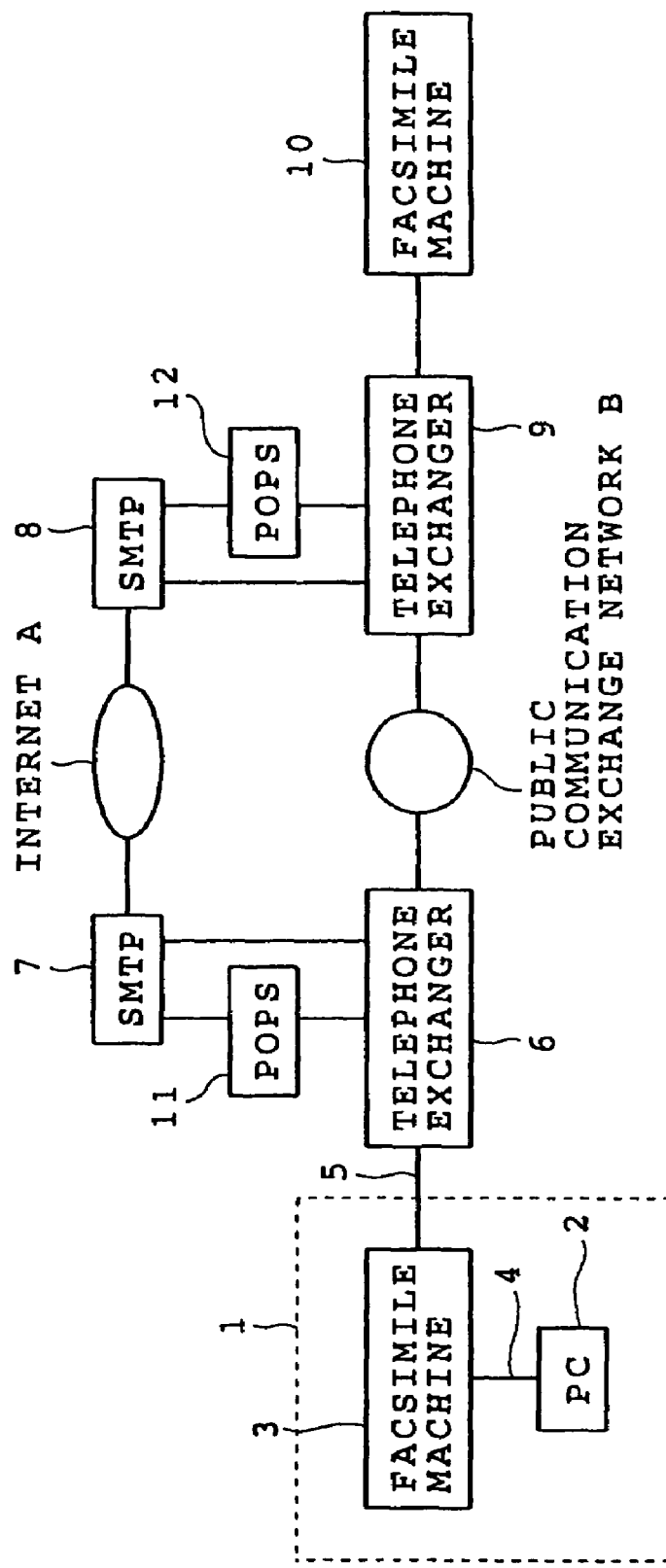
FIG. 1 is a block diagram of a communication line to which a facsimile system of one embodiment in accordance with the present invention is connected.

One embodiment of the present invention will be described with reference to FIGS. 1 to 10. Referring to FIG. 1, a communication line to which a facsimile system 1 in accordance with the present invention is connected is shown. The facsimile system 1 comprises a facsimile machine 3 and a personal computer (hereinafter, "PC") 2 connected to the facsimile machine 3 by a connecting cable 4. The facsimile machine 3 is connected to a telephone exchanger 6 by a telephone line 5. The telephone exchanger 6 is connected via a post office protocol server (POPS) 11 and a simple mail transfer protocol server (SMTP) 7 to an internet A. The internet A is connected to an SMTP 8 further connected via a POPS 12 and a telephone exchanger 9 to a facsimile machine 10 owned by an addressee. The telephone exchangers 6 and 9 are connected via a public communication exchange network B to each other. The facsimile machine 10 of the addressee has functions of transmitting and receiving data via the internet A or the public communication exchange network B.

Figure 2:
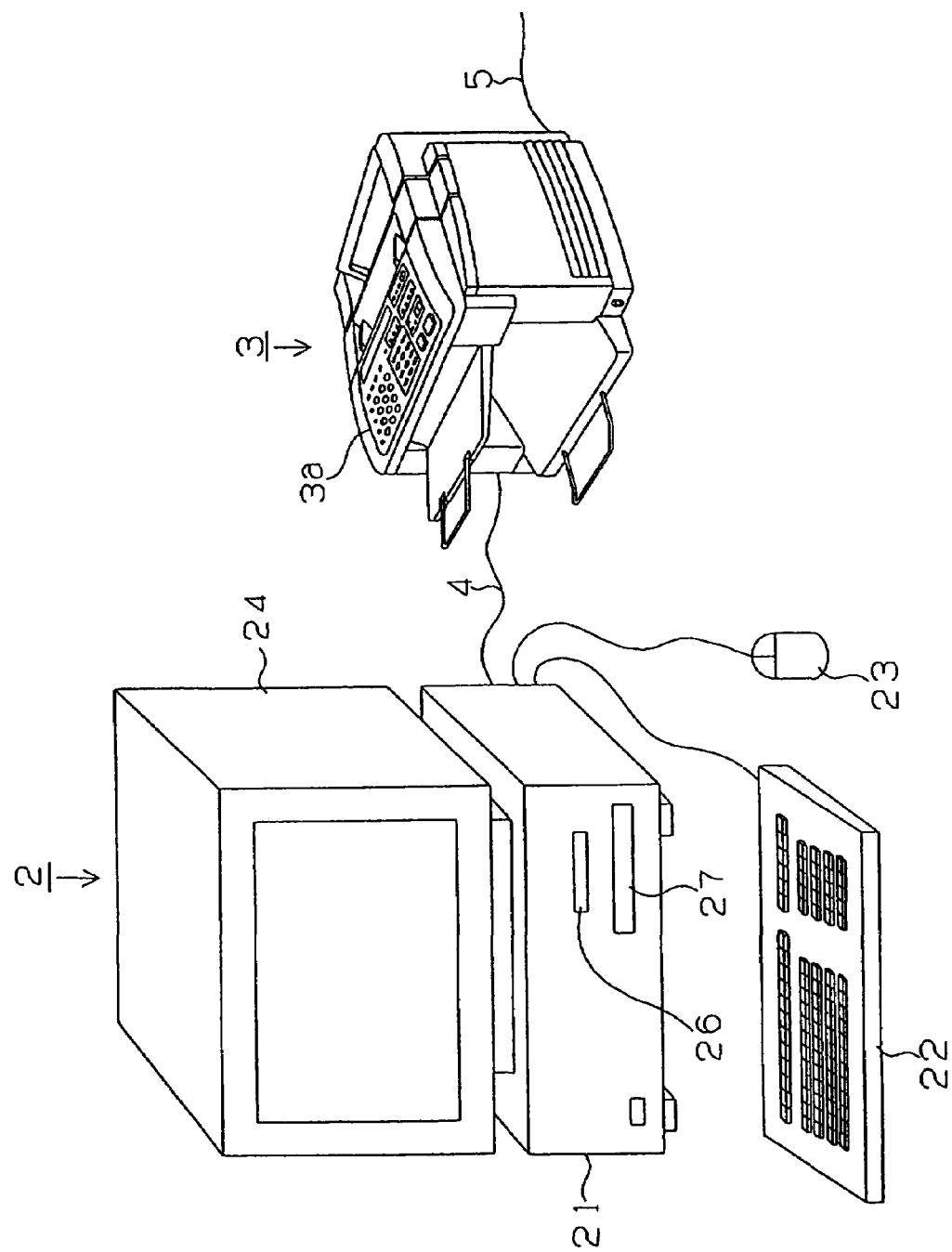
FIG. 2 is a perspective view of a personal computer and a facsimile machine both constituting the facsimile system.

An arrangement of the PC 2 will be described with reference to FIG. 2. The PC 2 comprises a computer body 21 incorporated with a CPU, a keyboard 22, a mouse 23, and a CRT monitor 24. The facsimile machine 3 is connected via the connecting cable 4 to the computer body 21. The keyboard 22 is used to input data of addressee identification information such as a name, a facsimile number or a mail address of an addressee. The computer body 21 is provided with an FD drive 26 for driving a 3.5-inch floppy disk (hereinafter, "FD") and a CD-ROM drive 27 for driving a CD-ROM. The FD drive 26 or the CD-ROM drive 27 is used to install an application program for controlling the data of addressee identification information. The CRT monitor 24 constitutes computer-side display means in the invention.

Figure 4:
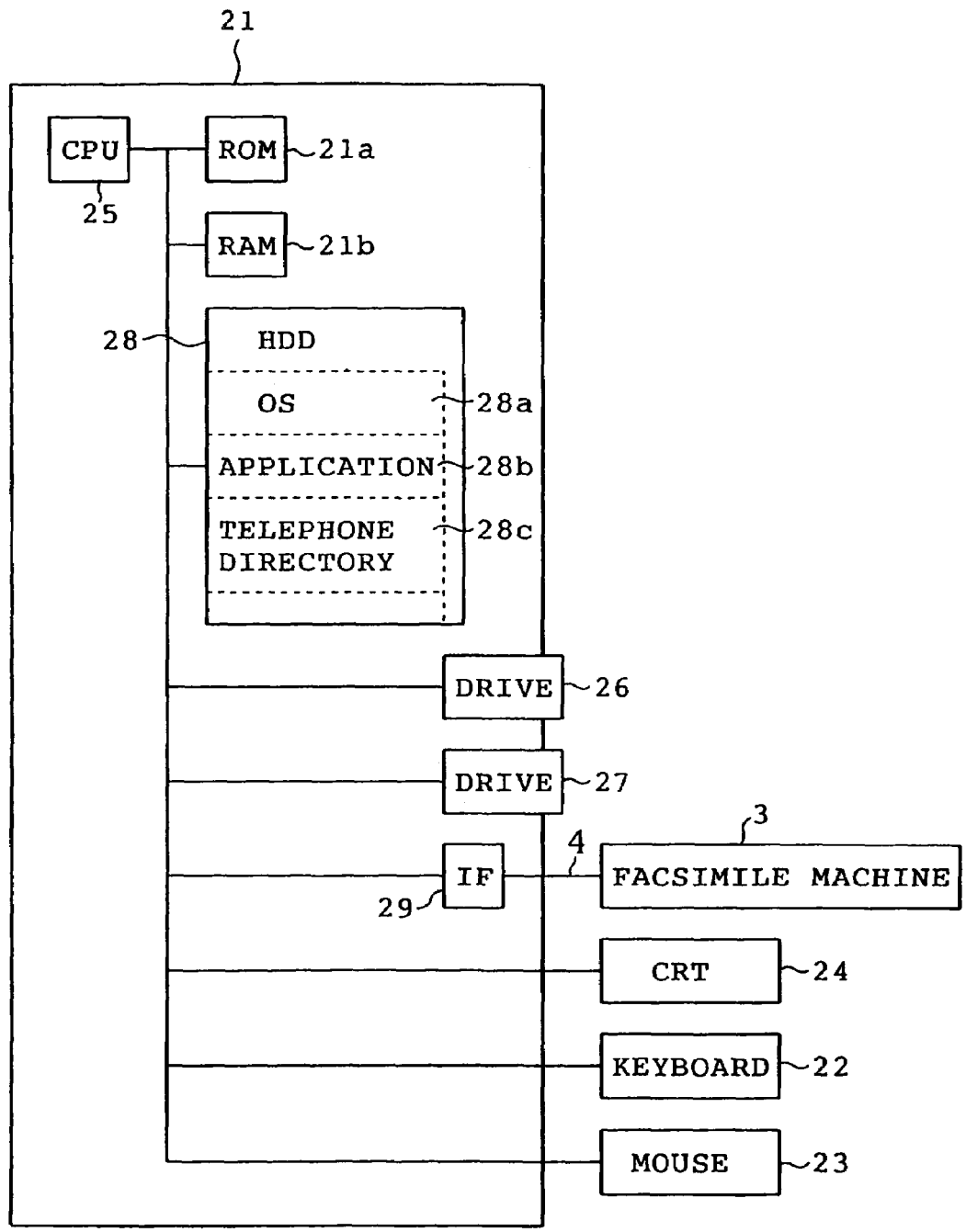
FIG. 4 is a block diagram showing an electrical arrangement of the personal computer shown in FIG. 2.

An electrical arrangement of the PC 2 will now be described with reference to FIG. 4. The computer body 21 includes a CPU 25 carrying out programs of an operating system and an application program for controlling a telephone directory (data file) in which data of addressee identification information including names, facsimile numbers and mail addresses of addressees to whom image data is transmitted from the facsimile machine 3. A ROM 21a, a RAM 21b, a hard disk drive (hereinafter, "HDD") 28 are connected to the CPU 25. An interface (IF) 29 is also connected to the CPU 25 for receiving via the connecting cable 4 various commands transmitted from the facsimile machine 3. An operating system 28a, various application programs 28b and a telephone directory 28c are stored in the HDD 28.

The telephone directory 28c will be described with reference to FIG. 6. For example, the telephone directory 28c is designed to be able to register one hundred sets of telephone directory data (Nos. 1 to 100). In each set, data of the name of an addressee, the corresponding facsimile number and mail address is registered. The HDD 28 constitutes computer-side storage means in the invention.

The facsimile machine 3 will be described with reference to FIG. 3. The facsimile machine 3 is of a multi-function type provided with a plurality of functions of facsimile, image scanning, printing and copying. A facsimile machine with only the facsimile function or with the facsimile function and one or more of the above-mentioned functions may be used, instead.

The facsimile machine 3 comprises a generally box-shaped housing 3j. An operation panel 3a is provided on a forward portion of the top of the housing 3j. The operation panel 3a comprises numeric keys 3b of "0" to "9" for input of a facsimile number of an addressee, a start button 3c for instruction to start reading an original etc., a stop button 3d for instruction to interrupt transmission of image data, abbreviated dialing buttons 3e for transmission of image data by use of an abbreviated facsimile number, a retrieval button 3f operated so that the CPU 25 of the PC 2 carries out retrieval of the telephone directory 28c stored in the HDD 28, and a registration button 3g operated for determining registration of addressee information input with the numeric keys 3b. The numeric keys 3b are adapted for entry of characters and symbols and accordingly, can be used for input of the name of addressee and mail address of an electronic mail.

A liquid-crystal display (LCD) 3h is provided in the rear of the operation panel 3g on the top of the housing 3j. The LCD 3h displays the name, facsimile number and mail address of an addressee, and an operating state of the facsimile machine 3. An original setting section 3i is provided in the rear of the LCD 3h for setting an original or manuscript carrying information to be transmitted or copied. The original set in the original setting section 3i is carried into the housing 3j by a paper feeding mechanism (not shown) provided in the housing 3j. An image scanner (shown by reference numeral 38 in FIG. 5) is provided for reading image information on the carried original. The original whose image information has been read by the image scanner is discharged onto a tray 3m through an original outlet 3k provided below the operation panel 3a, being stacked.

A recording paper setting section 3n is provided in the original setting section 3m. Sheets of recording paper for recording received image information or print data are set in the recording paper setting section 3n. A recording paper cassette (not shown) accommodating a plurality of sheets of recording paper in a stacked state is detachably attached to the recording paper setting section 3n. The recording paper accommodated in the cassette is carried into the housing 3j by the above-mentioned paper feeding mechanism. The image information or print data is recorded on the carried recording paper by a printer (shown by reference numeral 49 in FIG. 5). The recording paper on which the image information or print data has been recorded is discharged through a recording paper outlet 3p provided below the tray 3.

Figure 3:
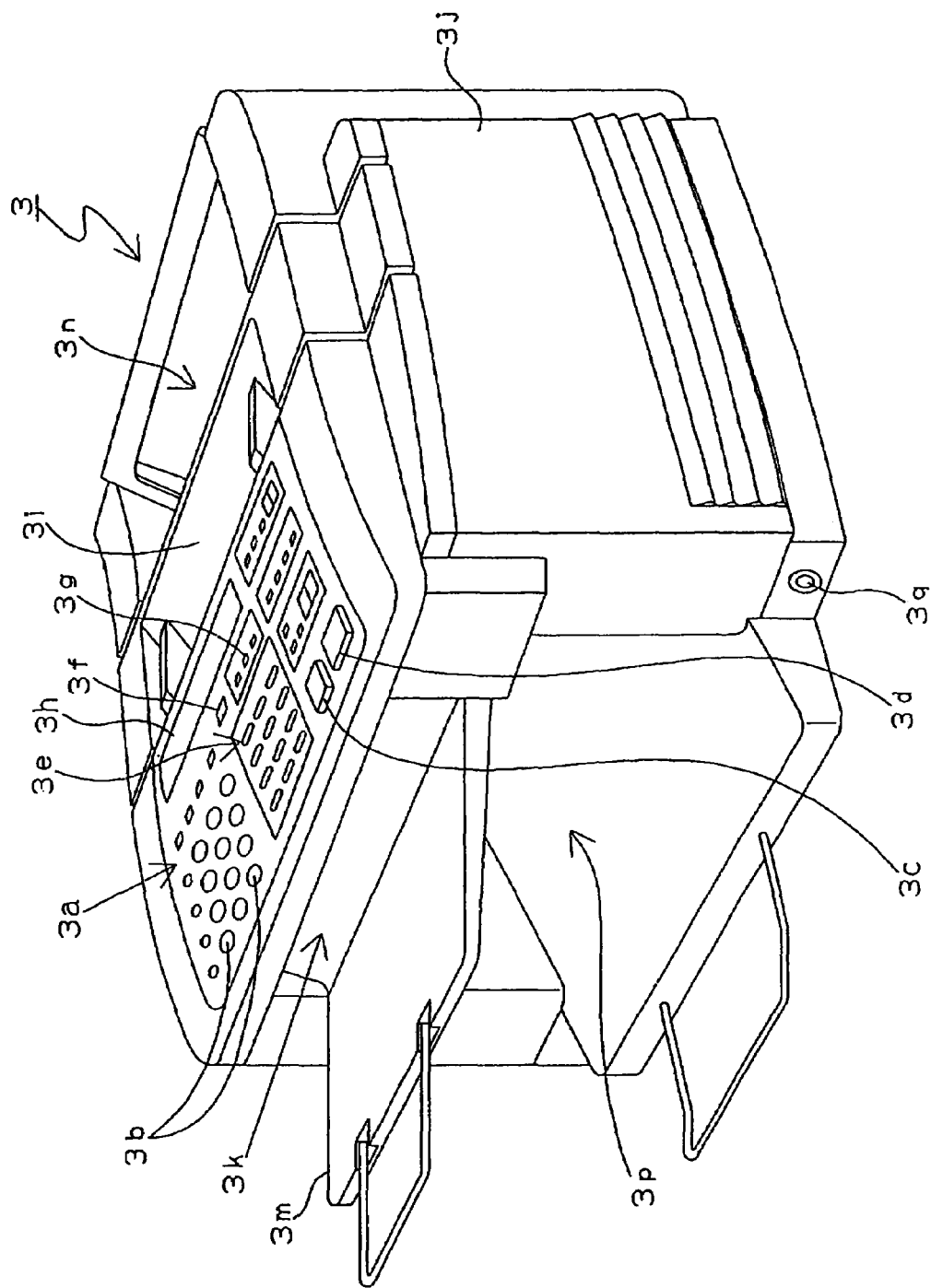
FIG. 3 is a perspective view of the facsimile machine.

A video signal input terminal 3q is provided on a lower right-hand portion of a front of the housing 3a as viewed in FIG. 3. A video camera (not shown) connected to the terminal 3q delivers video signals to the facsimile machine 3, so that image information is printed by the printer on the basis of the video signals. A communication terminal (not shown) connected to a telephone line 5 and a terminal (not shown) connected to the connecting cable 4 for connection to the PC 2 are provided on a rear of the housing 3a. A telephone receiver (not shown) is provided on a left-hand side of the housing 3 for the purpose of contact with an addressee. The retrieval button 3f constitutes instruction means and the LCD 3h constitutes facsimile-side display means in the invention.

Figure 5:
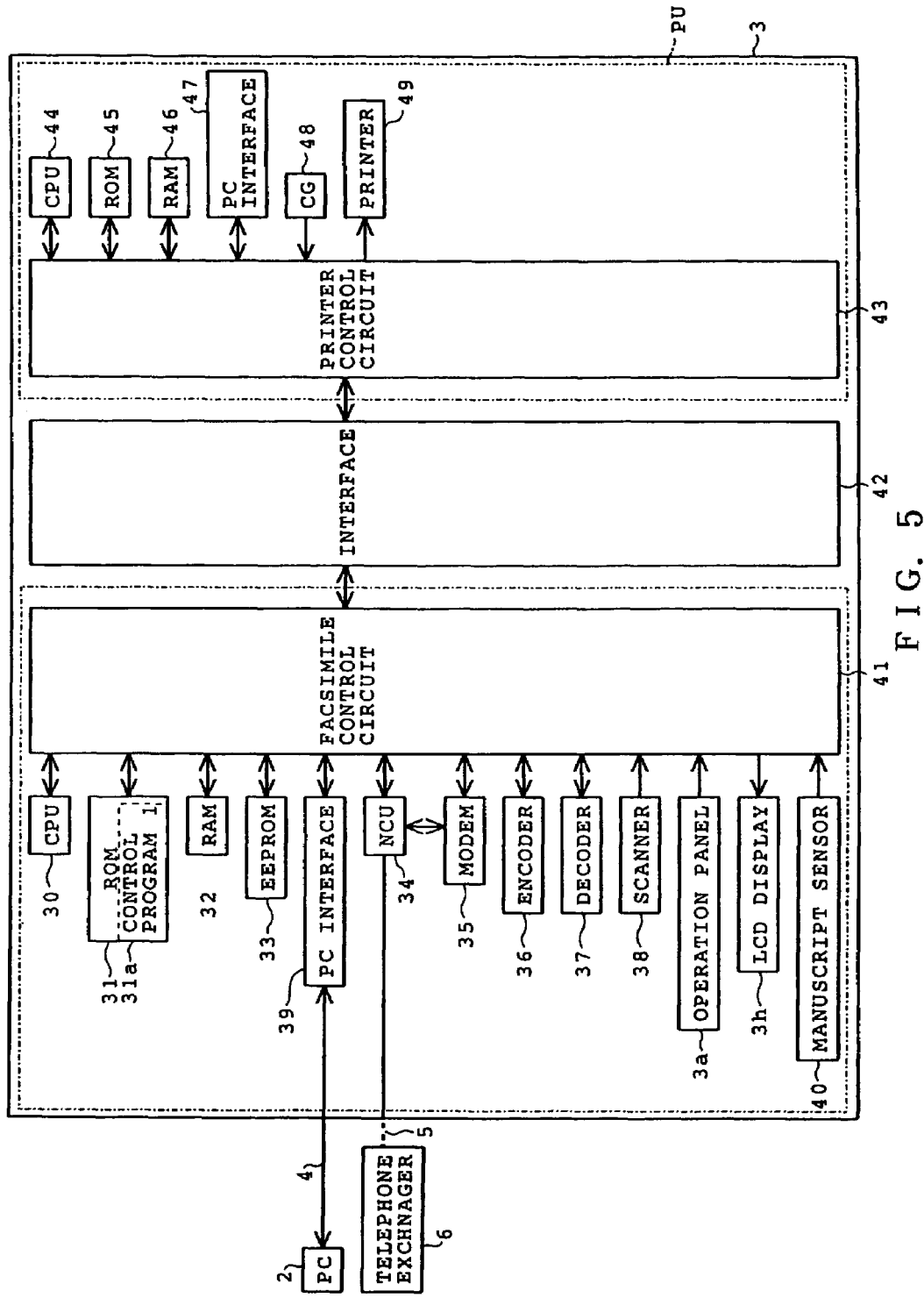
FIG. 5 is a block diagram showing an electrical arrangement of the facsimile machine shown in FIG. 2.

An electrical arrangement of the facsimile machine 3 will now be described with reference to FIG. 5. The facsimile machine 3 is provided with a facsimile unit FU and a printer unit PU. Both units are connected via an interface 42 to each other. The facsimile unit FU includes a CPU 30 for-controlling the image scanner 38, transmission and receiving of image information, and input and output of various commands and addressee information from and to the PC 2. The CPU 30 is connected to a facsimile control circuit 41. The ROM 31, the RAM 32 and the EEPROM 33 are connected to the facsimile control circuit 41. The ROM 31 stores a control program 31a on the basis of which the CPU 30 executes the above-mentioned controls. The RAM 32 temporarily stores image information read from the original by the image scanner 38. The EEPROM 33 erasably stores a telephone directory having the same arrangement as the telephone directory 28c stored in the HDD 28 of the PC 2. The abbreviated dialing buttons 3e correspond to registration numbers 1 to 12 respectively. Each of the registration numbers is accessible from the EEPROM 33 by operation of the corresponding abbreviated dialing button 3e. Regarding the other registration numbers, the numeric keys 3b are operated so that the desired registration number is accessible from the EEPROM 33 when the registration number is directly input.

Further, a PC interface 39, an NCU 34, a modem 35 and an original sensor 40 for detecting the setting of an original are connected to the facsimile control circuit 41. An encoder 36 and a decoder 37 are further connected to the facsimile control circuit 41. The encoder 36 encodes data of image information obtained by the image scanner 38 scanning an original to compressed data. The decoder 37 decodes encoded data of received image information.

On the other hand, the printer unit PU is provided with a printer control circuit 43 for controlling a printer 49. A CPU 44 executing a program for controlling the printer 49 is connected to the printer control circuit 43. A ROM 45, a RAM 46, a PC interface 47, a character generator (CG) 48 and the printer 49 are further connected to the printer control circuit 43. The ROM 45 stores the program executed by the CPU 44 and the like. The RAM 46 includes a work memory used when the CPU 44 executes the program and a print memory storing print data etc. The PC 2 is connected to the PC interface 47. The character generator 48 stores data of vector font of printing characters.

In the embodiment, the PC interface 39 is a parallel interface in conformity to the Centronics Standards. The facsimile machine 3 transmits and receives data to and from the PC 2 via the cable 4 connected to the PC interface 39. The EEPROM 33 constitutes facsimile-side storage means in the invention.

The control contents of the CPUs 30 and 25 will be described with reference to FIGS. 7A to 10. These control contents start with a process for referring to the telephone directory stored in the HDD 28 of the PC 2 and ends with a process for transmitting an electronic mail from the facsimile machine 3. First, FIGS. 7A and 7B show the contents of main processes executed by each CPU. The CPU 30 of the facsimile machine 3 carries out a registering process (step 100), a retrieval requiring process (step 120) and a transmission process (step 140) in this sequence as shown in FIG. 7A. In the registering process, addressee information is registered in the telephone directory stored in the EEPROM 33. The CPU 30 requires the PC 2 to retrieve the addressee identification information in the retrieval requiring process. In the transmission process, data of image information the image scanner 38 has scanned from the original is transmitted, accompanied with an electronic mail. Alternatively, the data is transmitted via a public telephone line to a facsimile machine of the addressee.

The CPU 25 of the PC 2 carries out a synchronous registering process (step 200) and a retrieving process (step 220) sequentially as shown in FIG. 7B. In the synchronous registering process, the CPU 25 registers the telephone directory having the same contents as the telephone directory stored in the facsimile machine 3 in synchronization with build-up of power supply to the facsimile machine 3 and registration of addressee identification information. In the retrieving process, the CPU 25 retrieves the data of addressee identification information in response to the retrieval requirement from the CPU 30 of the facsimile machine 3.

Figures 8A, 8B:
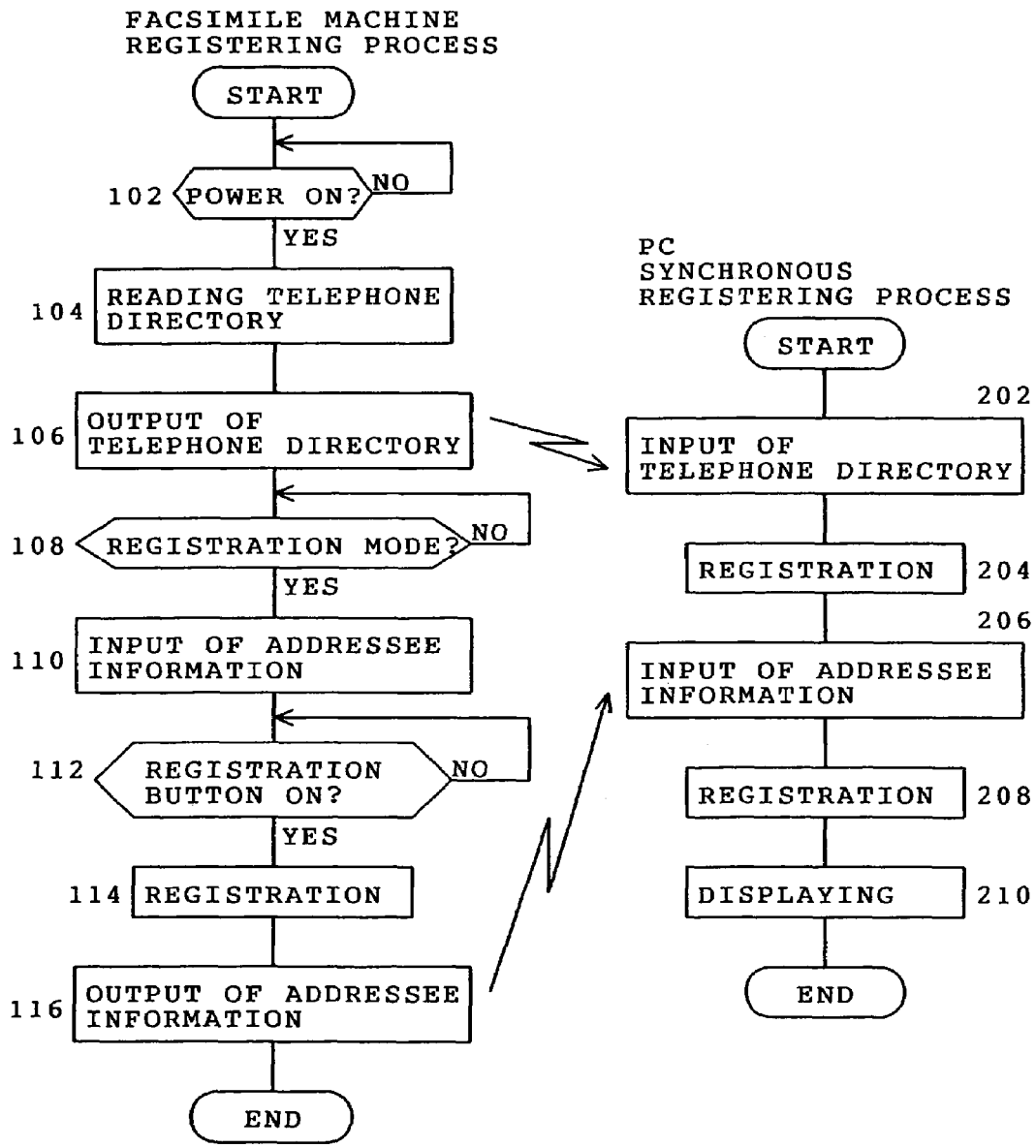
FIGS. 8A and 8B are flowcharts showing the contents of a registering process the CPU 30 carries out at step 100 in FIG. 7A and the contents of a synchronous registering process the CPU 25 carries out at step 200 in FIG. 7A respectively.

The registering process the CPU 30 executes at step 100 and the synchronous registering process the CPU 25 executes at step 200 will now be described in detail with reference to FIGS. 8A and 8B. First, the CPU 30 detects power-on of the facsimile machine 3 (YES at step 102) and then reads the data of telephone directory stored in the EEPROM 33 (step 104). The CPU 30 delivers the read data of telephone directory via the PC interface 39 to the PC 2 (step 106).

On the other hand, the CPU 25 of the PC 2 inputs the output data of telephone directory (step 202), registering the input data in the telephone directory 28*c* of the HDD 28 thereof (step 204). In this case, a previous data of the telephone directory 28*c* of the HDD 28 is renewed by a new one.

The CPU 30 then judges whether the facsimile machine 3 is in a mode for registration of the data of addressee identification information (step 108). When the facsimile machine 3 is in the mode (YES at step 108), the CPU 30 inputs the data of addressee identification information the user has supplied by operation of the numeric keys 3*b* (step 110). Upon detection of the ON state of the registration button 3*g* for determining registration of the input data of addressee identification information (YES at step 112), the CPU 30 registers in the EEPROM 33 the data of addressee identification information input at step 110 (step 114). The CPU 30 then delivers the same data of addressee identification information as the registered one to the PC 2 (step 116). The CPU 25 of the PC 2 inputs and registers the output data of the addressee identification information in the telephone directory 28*c* of the HDD 28 (steps 206 and 208). The renewed contents of the telephone directory are displayed on the CRT monitor 24 (step 210).

In the above-described facsimile system 1, the telephone directory having the same contents as that stored in the facsimile machine 3 is automatically stored in the PC 2. The user can view the telephone directory having the same contents when operating either the facsimile machine 3 or the PC 2. This is convenient for the user.

The retrieval requiring process the CPU 30 executes at step 120 and the retrieving process the CPU 25 executes at step 220 will now be described in detail with reference to FIG. 9. First, the CPU 30 detects input of retrieved characters, namely, the initials of the addressee or characters indicative of part of the name of addressee with the numeric keys 3*b* (YES at step 122). Upon detection of the ON state of the retrieving button 3*f* (YES at step 124), the CPU 30 delivers to the PC 2 a retrieval requiring command (retrieving command) indicative of requirement of retrieval of the addressee identification information containing the retrieved characters (step 126).

On the other hand, when detecting input of the retrieval requiring command (YES at step 222), the CPU 25 of the PC 2 retrieves the data of addressee identification information containing the retrieved characters indicated by the retrieval requiring command in the telephone directory 28*c* of the HDD 28 thereof, extracting the data (step 224). The CPU 25 then delivers the results of extraction to the facsimile machine 3 (step 226).

The CPU 30 inputs the output results of extraction (step 128), displaying them on the LCD 3*h* (step 130). When a plurality of results of extraction are present, one of the data of addressee identification information is selected with the numeric keys 3*b* (step 132). Thereafter, upon detection of the ON state of the registration button 3*g* (YES at step 134), the CPU 30 registers the selected addressee identification information in the telephone directory of the EEPROM 33 (step 136).

In the above-described facsimile system 1, the data of telephone directory stored in the PC 2 can be retrieved at the facsimile machine 3 side, which side is away more or less from the PC 2. Consequently, the user need not move from the location of the facsimile machine 3 to the location of the PC 2 every time of retrieval.

Figure 10:
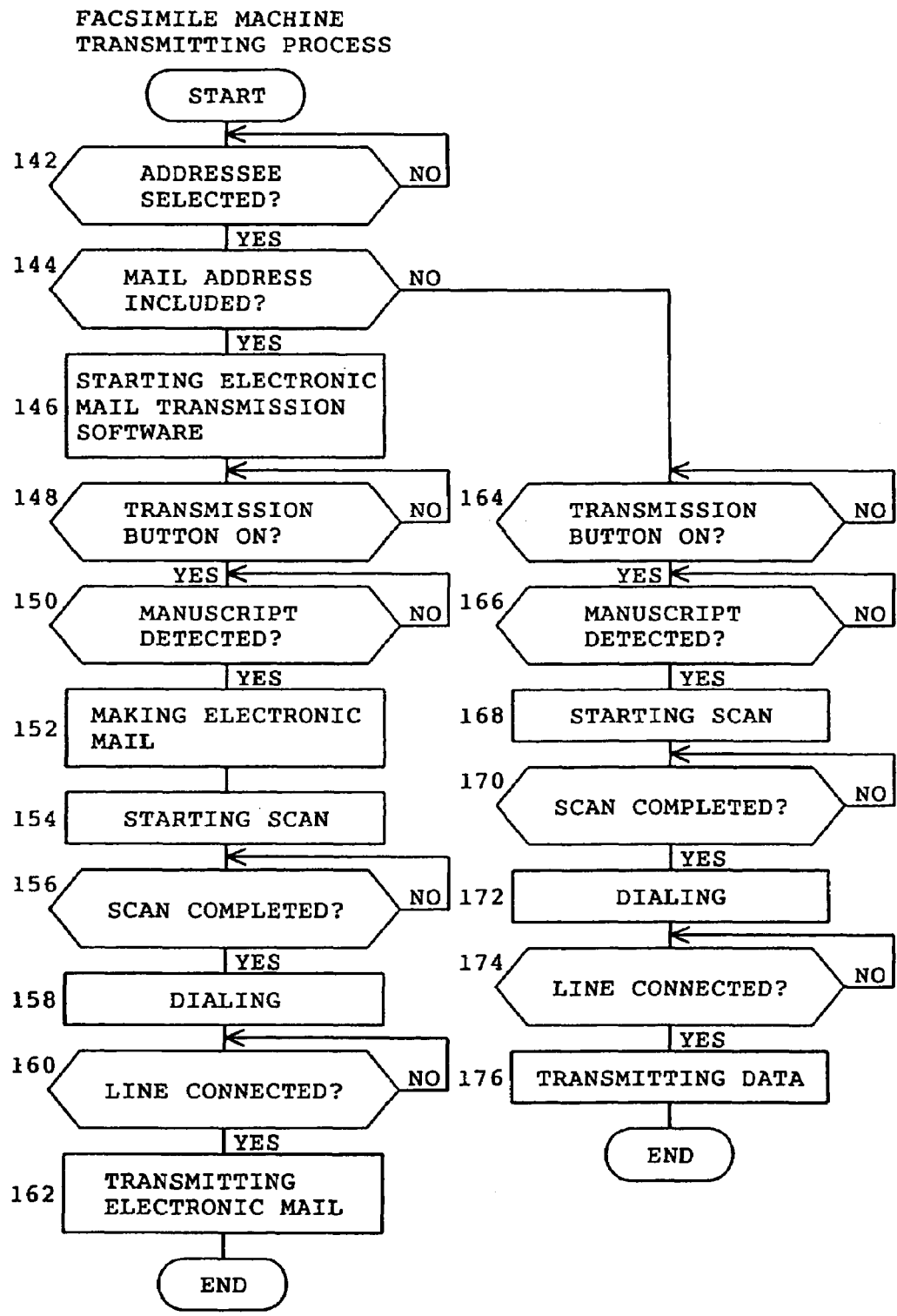
FIG. 10 is a flowchart showing the contents of a transmission process the CPU 30 carries out at step 140 in FIG. 7A.

The transmission process the CPU 30 of the facsimile machine 3 executes at step 140 in FIG. 7A will be described with reference to FIG. 10. In the following description, the user of the facsimile machine 3 transmits an electronic mail accompanying the data of image information to an addressee registered as No. 1 (see FIG. 6). The CPU 30 detects selection of the registration No. 1 addressee on the basis of operation of the abbreviated dialing button 3*e* (YES at step 142). The CPU 30 then judges whether a mail address of the selected addressee is registered (step 144). Since the mail address of the selected addressee No. 1 has been registered (YES at step 144), the CPU 30 starts up a software for electronic mail transmission (step 146).

The CPU 30 then makes an electronic mail (step 152) when detecting the ON state of the transmission button 3*c* (YES at step 148) and then the setting of an original on the basis of the output signal from the original sensor 40 (YES at step 150). The CPU 30 then starts the scan of the original by the image scanner 38 (step 154). Upon detection of completion of the scan (YES at step 156), the CPU 30 dials to the SMTP 7 (step 158). Upon detection of connection to the SMTP 7 (YES at step 160), the CPU 30 transmits the electronic mail accompanying the image data obtained from the original by the scanning (step 162).

The electronic mail is transmitted from the SMTP 7 via the internet A and the SMTP 8 to the POPS 12. The addressee accesses at the facsimile machine 10 to the POPS 12 so that the electronic mail stored in the POPS 12 is received by the facsimile machine 10 of the addressee.

When judging that the mail address of the selected addressee is not registered (NO at step 144), the CPU 30 detects the ON state of the transmission button 3*c* (YES at step 164). Further, when detecting the setting of the original on the basis of the output signal of the original sensor 40 (YES at step 166), the CPU 30 starts the scan of the original by the image scanner 38 (step 168). Upon detection of completion of the scan (YES at step 170), the CPU 30 dials to the telephone exchanger 6 (step 172). Upon detection of connection to the telephone exchanger 6 (YES at step 174), the CPU 30 transmits the image data obtained from the original by the scanning (step 176).

According to the above-described facsimile system 1, when the mail address of the selected addressee has been registered, a communication channel via the internet A is automatically selected so that the data of image information can be transmitted with the electronic mail. This can save a time for switching the communication channel depending upon presence or absence of a mail address of the selected addressee.

In the foregoing embodiment, the communication channel can manually be switched from that via the internet A to the public communication exchange network B which is not via the internet A when a facsimile number of the selected addressee has been registered. For example, the operation for selecting the public communication exchange network B may be executed before the transmission button 3c is turned on or subsequently to the operation for selecting an addressee.

Figures 9A, 9B:
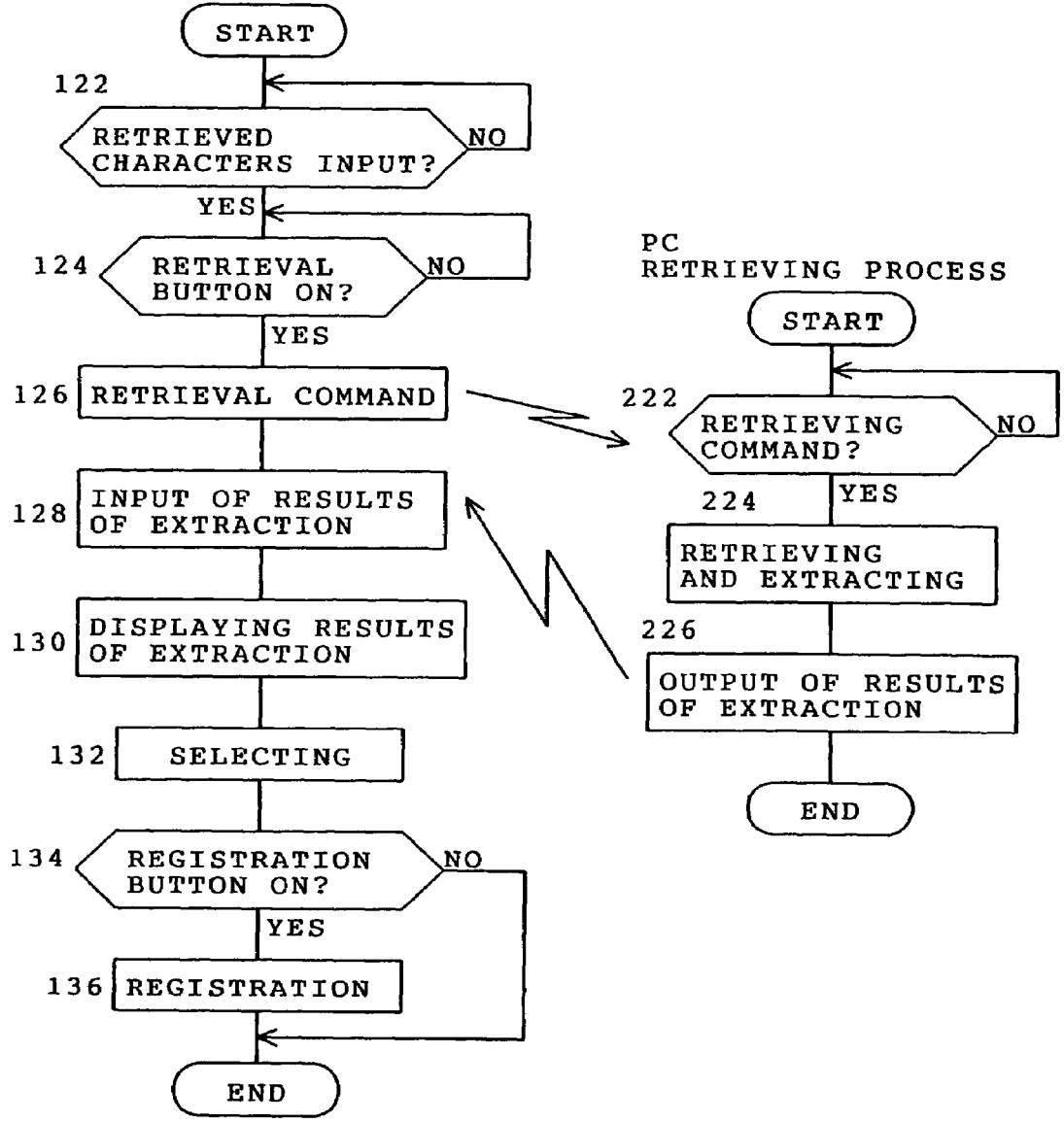
FIGS. 9A and 9B are flowcharts showing the contents of a retrieval requiring process the CPU 30 carries out at step 120 in FIG. 7A and a retrieving process the CPU 25 carries out at step 220 in FIG. 7B respectively.

In the foregoing embodiment, the data of telephone directory stored at the computer side is retrieved and extracted to thereby be registered at the facsimile machine side by the processes shown in FIG. 9B. The data of telephone directory registered at the facsimile machine side is designated and the data of image information is transmitted by the processes shown in FIG. 10. For example, however, the data of telephone directory extracted at the computer side may temporarily be stored in a suitable memory area such as a RAM without being registered in the EEPROM 33, and the data of image information may be transmitted to an addressee indicated by the temporarily stored data. In this case, data of one or more of the addressees is not stored at the facsimile side. When the user operates the facsimile machine so that the addressee is retrieved on the basis of a character string of the addressee, the data of telephone directory in the computer is retrieved, the corresponding data of telephone directory is automatically taken into the facsimile machine to be stored in the temporal storage area. Further, the retrieved data of telephone directory is displayed on a display, for example. Confirming the displayed contents, the user depresses the transmission button when they are right, so that the data of image information can be transmitted to a desired addressee. Thus, the user can transmit the data of image information to the addressee registered in the telephone directory at the computer side only by the operation at the facsimile machine side.

On the other hand, when part of the extracted data of telephone directory cannot be displayed on the display of the facsimile machine upon retrieval of the telephone directory at the computer side, all the data of telephone directory may once be displayed on the display at the computer side. The user may select a desired data of telephone directory, which may be taken into the facsimile machine side on the basis of the selection.

Step 224 executed by the CPU 25 of the PC 2 functions as computer-side referring means in the invention. Step 126 executed by the CPU 30 of the facsimile machine 3 functions as instruction means. Step 226 executed by the CPU 25 functions as computer-side output means. Step 128 executed by the CPU 30 functions as facsimile-side input means. Step 114 executed by the CPU 30 functions as facsimile-side registering means. Step 116 executed by the CPU 30 functions as facsimile-side output means. Step 206 executed by the CPU 25 functions as computer-side input means. Step 130 executed by the CPU 30 functions as facsimile-side display means. Step 210 executed by the CPU 25 functions as computer-side display means. Step 142 executed by the CPU 30 functions as selecting means. Step 162 executed by the CPU 30 functions as transmission means.

According to the above-described embodiment, when the instruction means of the facsimile machine 3 gives the PC 2 an instruction to refer to the addressee identification information, the computer-side referring means of the PC 2 refers to the data of addressee identification information stored in the storage means (the HDD 28) and the data of addressee identification information referred to by the computer-side referring means can also be referred to by the facsimile machine 3. Accordingly, part of the data of the addressee identification information that cannot be stored at the facsimile machine 3 side can freely be referred to by the instruction means at the facsimile machine 3 side when stored in the computer-side storage means of the PC 2. Consequently, a quantity of substantially storable data of addressee identification information can be increased to a large degree.

Particularly in the foregoing embodiment, the data of addressee identification information stored in the computer-side storage means (the HDD 28) can be taken into the facsimile-side storage means (the EEPROM 33). Accordingly, for example, when desired data of addressee identification information is stored in the computer-side storage means, the information can be referred to and taken into the facsimile machine 3 side to thereby be stored. As a result, data of image information can readily be transmitted to a desired addressee on the basis of the stored information.

Further, the date of addressee identification information registered at the facsimile machine 3 side can also be registered in the PC 2 side. Accordingly, since the same data of addressee identification information can be controlled both by the facsimile machine 3 and by the PC 2, the data of addressee identification information having a low frequency of use can be reserved in the computer-side storage means even when deleted from the facsimile-side storage means. Consequently, the facsimile-side storage means can efficiently be used. Further, information which has been deleted once can readily be recovered in the facsimile-side storage means.

Further, the facsimile machine 3 side can give the PC 2 side an instruction to retrieve the data of addressee identification information. Further, the results of retrieval are displayed at the facsimile machine 3 side such that the contents thereof can be confirmed. This can save a time required for displaying the results of retrieval on the display at the PC 2 side and thereafter re-inputting the data of addressee identification information at the facsimile machine 3 side. Further, the computer-side display means can display a larger quantity of data of the results of extraction than the facsimile-side display means. Accordingly, when the results of extraction by the computer-side referring means has a quantity of information that cannot partially be displayed on the display means provided in the facsimile machine 3, the destination of the information can be switched to the computer-side display means. For example, when a list of addressees having the same initials is displayed, the list can contain a larger number of addressees when displayed on the computer-side display means than when displayed on the facsimile-side display means. Consequently, a target name of addressee can quickly be found.

Further, the facsimile machine 3 is provided with the selecting means which can select either the data of addressee identification information stored in the storage means at the facsimile machine 3 side or that stored in the storage means at the PC 2 side. Further, the image information can be transmitted to the addressee indicated by the selected data of addressee identification information via or not via the internet. For example, even when desired data of addressee identification information is stored in the computer-side storage means, the data can be referred to by an instruction at the facsimile machine 3 side. Further, when selected by the selecting means, necessary data of addressee identification information is automatically taken into the facsimile machine 3 side so that the data of image information can be transmitted to a desired addressee on the basis of the data of address identification information. At this time, the user can perform all the operations necessary for the transmission only at the facsimile machine 3 side. Particularly when the selected data of addressee identification information contains the mail address, the communication channel via the internet can automatically be selected for transmission of the data of image information. This can save a time required for switching the communication channel depending on the contents of the selected data of addressee identification information.

Further, a mail address is generally composed of a plurality of characters and/or symbols. When such a mail address is registered with input keys (unsuitable for input of characters) of a conventional facsimile machine and a small-sized liquid crystal display, the registration takes much time and accordingly reduces the working efficiency. In the foregoing embodiment, however, the character input work can be done with the keyboard and the large-sized display at the PC 2 side. Consequently, the working efficiency can be improved to a large degree. Further, the data of addressee identification information input as described above can readily be referred to at the facsimile machine 3 side. Further, if the displayed data is a necessary one, it can readily be taken into the facsimile machine 3 side by the operation thereat. This is effective for equipment provided with a function of transmitting data of image information via the internet.

In the above-described facsimile system, an application program for execution of internet facsimile (hereinafter, "application") is carried out in the PC 2 so that address information of addressees is registered and a desired addressee is selected from the registered addresses, whereby the address can readily be ascertained without input of the characters of the address one by one.

On the other hand, the PC 2 can also operate an application for execution of electronic mail. According to the application, address information of addressees is registered so that the address of a desired addressee can readily be ascertained without input of the characters of the address one by one when the address is selected from the registered addressees. However, the address information registered on the electronic mail application cannot be used on the internet facsimile application since these are independent applications.

Figure 11:
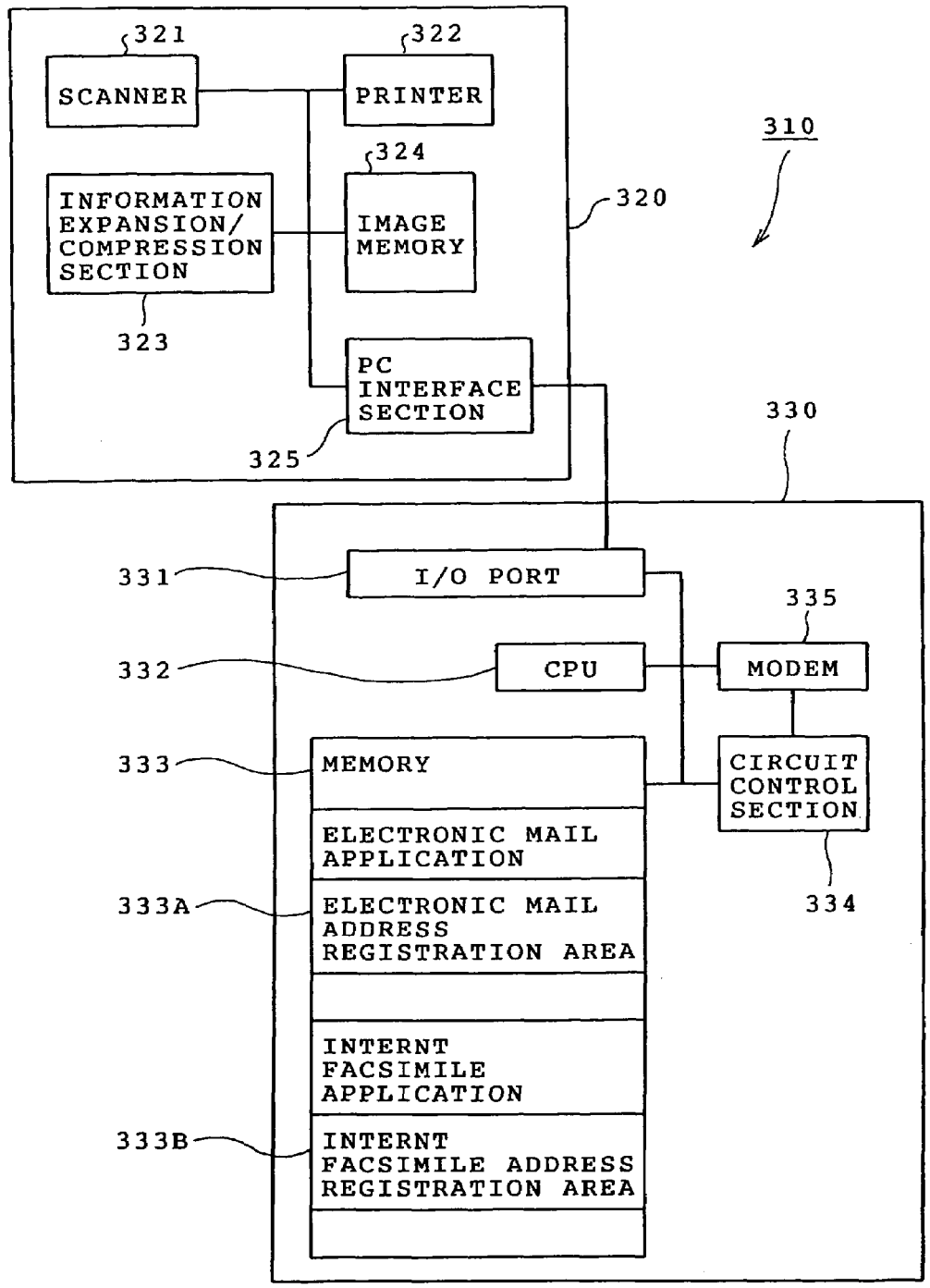
FIG. 11 is a block diagram of an internet facsimile machine of another embodiment in accordance with the present invention.

A second embodiment of the invention is directed to a solution of the above-described problem. The second embodiment will now be described with reference to FIGS. 11 to 13. Referring to FIG. 11, the arrangement of an internet facsimile machine 310 in accordance with the invention is schematically shown. The internet facsimile machine 310 comprises an image processing section 320 and a PC 330. The image processing section 320 includes a scanner 321 for reading images, a printer 322 for printing the images, an information expansion/compression section 323 for expanding received image information and compressing image information to be transmitted, an image memory 324 for storing image information compressed by the information expansion/compression section 323, and a PC interface section 325 rendering information exchange between the image processing section 320 and the PC 330 possible. A general type of facsimile machine or the multifunction type facsimile machine as described in the foregoing embodiment may be used as the image processing section 320. The image processing section 320 is connected via the PC interface section 325 to the PC 330 or, more specifically, to an I/O port 331 thereof.

The PC 330 comprises a CPU 332, a memory 333, a line control section 334, and a modem 335 for modulating and demodulating signals. The memory 333 of the PC 330 stores an application for execution of electronic mail and an internet facsimile application for execution of internet facsimile transmission. The memory 333 comprises a ROM, a RAM or a hard disk.

The application for execution of electronic mail is well known in the art. For example, an address of the addressee is stored in a predetermined area of the memory 333 of the PC 330 so as to correspond to the name of the addressee, whereby the address of the addressee is registered. Thereafter, when the user inputs the name of the addressee on the PC 330 using keys, an electronic mail can automatically be transmitted to the addressee without input of the address.

In the internet facsimile application, data of image information read by the scanner 321 is compressed by the information expansion/compression section 323, and the compressed data is stored in the image memory 324. The data of image information is converted so as to have a format transmittable on the internet. Further, the data of image information is transmitted via the internet to an address input on the PC 330. In the internet facsimile application, furthermore, the data of image information received via the internet is converted to a format suitable for the subsequent processes and then stored in the image memory 324. The data is expanded by the information expansion/compression section 323 and then printed by the printer 322.

The memory 333 of the PC 330 is provided with an internet facsimile address registration area 333B for storing address information used in the internet facsimile application.

Figure 12:
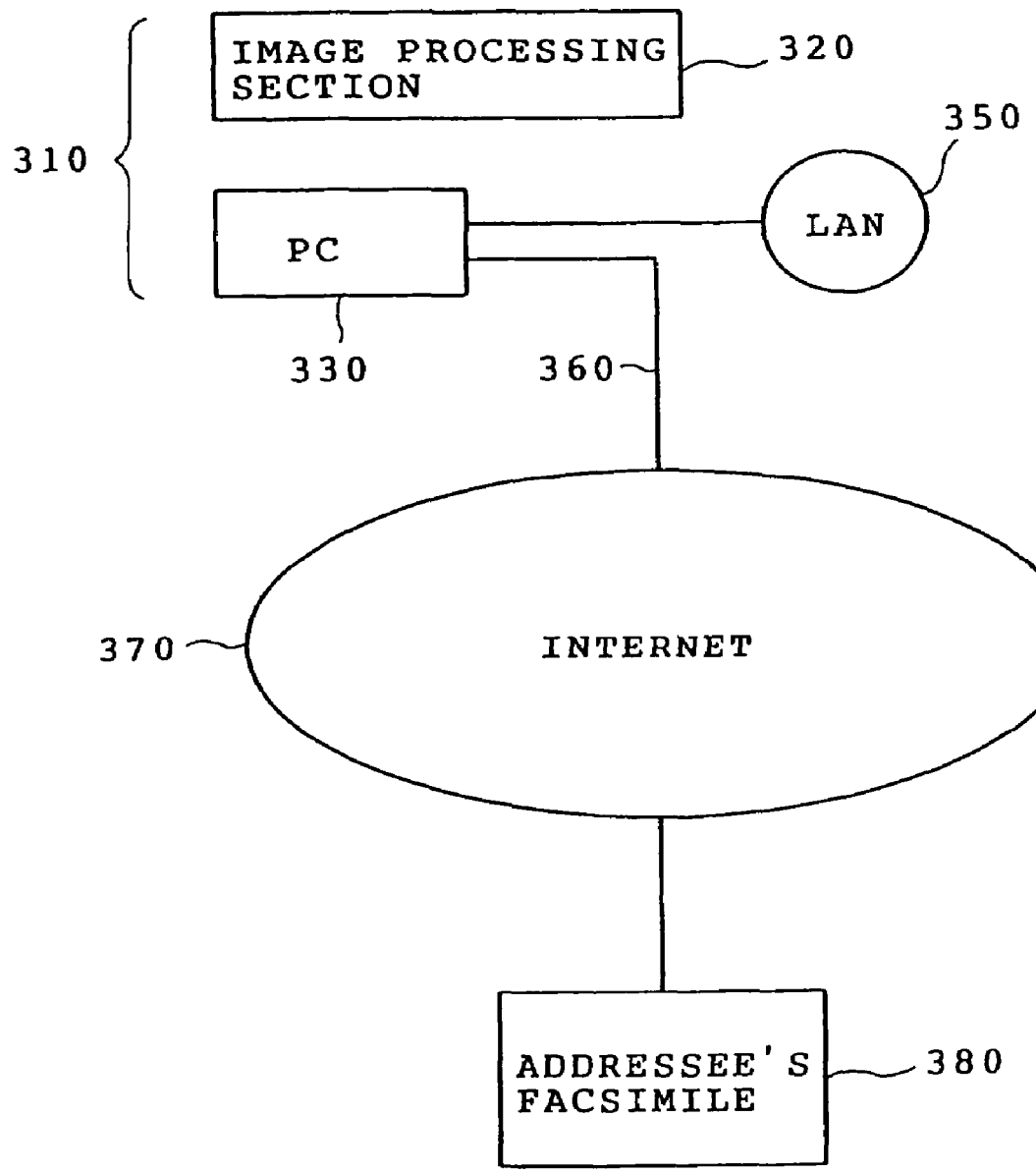
FIG. 12 is a schematic block diagram of a communication network to which the internet facsimile machine is connected.

FIG. 12 schematically illustrates a communication network to which the internet facsimile machine 310 is connected. The machine 310 is connected to a LAN 350 and further via a public communication line 360 and an internet 370 to a facsimile machine 380 of an addressee.

Figure 13:
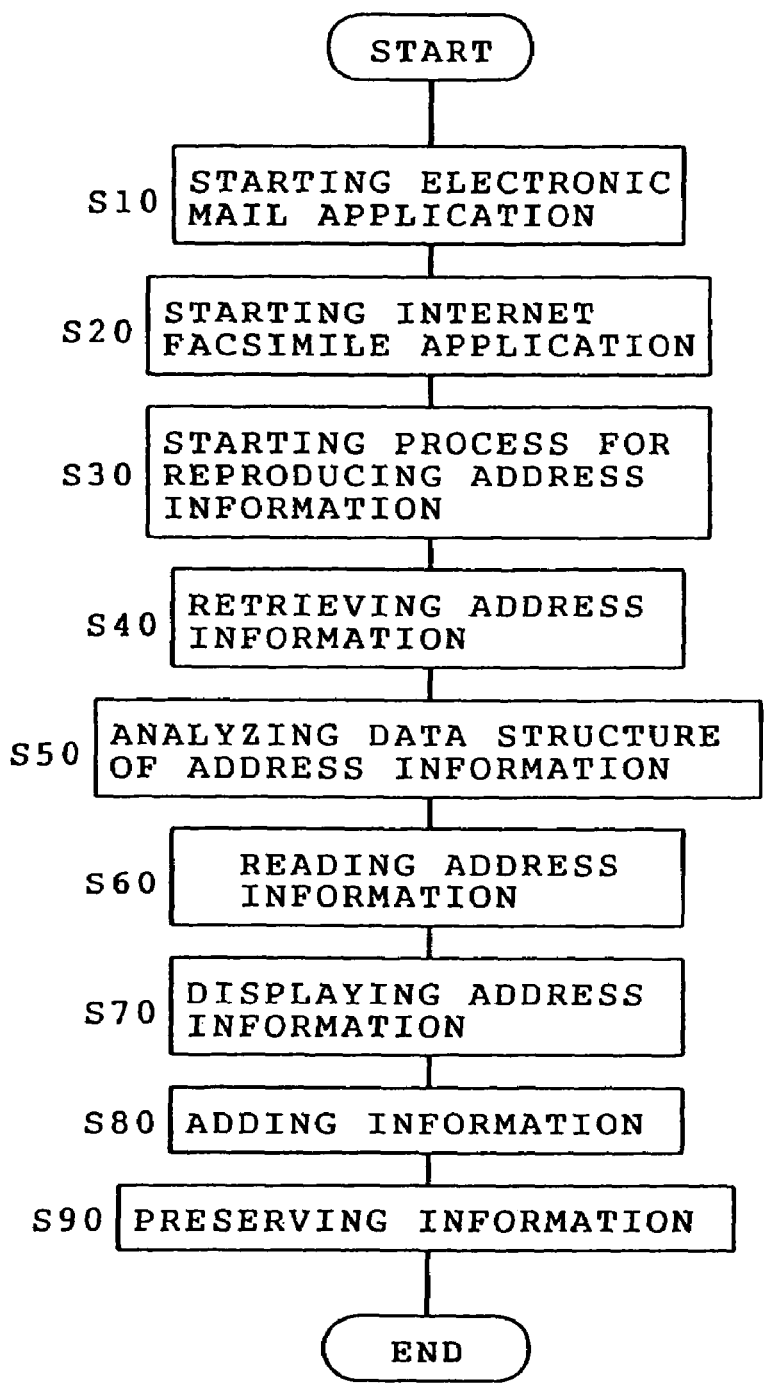
FIG. 13 is a flowchart showing processes for diverting, to the use with an internet facsimile application, address information registered by an electronic mail application which is stalled in a personal computer and is already in operation.

The electronic mail application is installed in the PC 330 of the internet facsimile machine 310 and is already in operation. FIG. 13 shows processes for diverting address information having registered by the above-mentioned electronic mail application to a purpose of use in the internet facsimile application. First, the electronic mail application is started up (step S10). Address information is already registered in the electronic mail application. The address information contains addresses of addressees, words identifying the respective addressees, for example, the respective names of the addressees. The internet facsimile application is then started up (step S20). A process for copying address information by the internet facsimile application is then started (step S30). In this process, address information is made by the electronic mail application and stored in the electronic mail address registration area 333A is retrieved (step S40) and the data structure of the information is analyzed (step S50). Various types of electronic mail applications employ particular manners for storing the address information. The above-mentioned analysis of the data structure is carried out in order that the storing manner of actually stored address information may be found.

The address information is then read on the basis of the results of analysis of the data structure (step S60). The read address information is displayed on a display of the PC 330 (step S70). Thereafter, data of information such as the address, telephone number, etc. is added to the address information on display, if necessary (step S80). The data of information is stored in the internet facsimile address registration area 333B according to a storing format by the internet facsimile application so that the data is rendered usable on the internet facsimile application (S90). The process is then completed.

The address information registered in the internet facsimile as described above is read out by the internet facsimile application in the same manner as address information registered on the internet facsimile application.

The same addressee is common to the electronic mail address and the internet facsimile address in the embodiment. However, even when both addresses differ from each other, each address can be registered as that for the internet facsimile depending on the aspect of the analysis. For example, when a plurality of addresses correspond to one addressee, the first address may be defined as the electronic mail address, whereas the second address may be defined as the internet facsimile address. As a result, the address of the same addressee can be prevented from duplicate.

The address information having already registered on the basis of the electronic mail application can be diverted to the purpose of use on the internet facsimile application as the result of execution of the above-described processes. Accordingly, the same address need not be registered individually on the electronic mail application and on the internet facsimile application. Consequently, the user can save the time.

In a modified form of the second embodiment, display of the address information at step S70 in FIG. 13, addition of information at step S80, and start-up of the electronic mail application at step S10 may be eliminated. Further, both of the electronic mail application and the internet facsimile application are installed in the same personal computer in the second embodiment. However, the applications may be installed in the different personal computers respectively so that the electronic mail application is used by communication between the personal computers.

The internet facsimile machine 310 comprises the image processing section 320 (the facsimile machine) and the PC 330 (personal computer) in the second embodiment. However, for example, the internet facsimile machine may comprise a personal computer to which a scanner, a printer, a modem, etc. are connected. Further, the programs including various applications and OS for operating the facsimile machine and the personal computer are stored in the ROM and HDD in the foregoing embodiments. However, these programs may be stored in a CD-ROM or FD, instead.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A communication system comprising;
   a communication terminal having a function of specifying an addressee from addressee identification information to communicate with the specified addressee;
   a computer transmitting addressee identification information to the communication terminal;
   a computer-side store unit provided at a computer side that stores the addressee identification information;
   a computer-side fetching unit provided at the computer side that fetches the addressee identification information from the computer-side store unit;
   a computer-side output unit that outputs the fetched addressee identification information to the communication terminal in case of communication so that the communication is executed according to a piece of addressee identification information selected from the fetched addressee identification information;
   a retrieval information input unit provided in the communication terminal and operated by an operator for input of retrieval information relating the addressee identification information;
   an instruction unit provided in the communication terminal so as to instruct the computer at the communication terminal side to retrieve via the computer-side fetching unit the addressee identification information stored in the computer-side store unit, the instruction unit instructing the computer to fetch the addressee identification information based on the retrieval information supplied by an operator; and
   a terminal side display that displays the addressee identification information outputted by the computer-side output unit so that the piece of addressee identification information is selected at the communication terminal side.

2. The communication system according to claim 1, wherein the communication terminal includes a terminal-side input unit provided so that the addressee identification information output is received in the communication terminal and a terminal-side store unit that stores the addressee identification information supplied to the terminal-side input unit.

3. The communication system according to claim 2, wherein the communication terminal includes a selector that selects the addressee identification information stored in the terminal-side store unit and at least one of the addressee identification information stored in the computer-side store unit, said one of the addressee identification information being the one fetched by the computer-side fetching unit, and a transmitter that transmits image data to an addressee indicated by the addressee identification information selected by the selector.

4. The communication system according to claim 1, wherein the communication terminal includes a terminal-side output unit that outputs the addressee identification information received by the terminal-side input unit, the computer includes a computer-side input unit, and the computer-side store unit stores the addressee identification information received by the computer-side input unit.

5. The communication system according to claim 1, wherein the computer includes a computer-side display provided at the computer side that displays fetched addressee identification information so that the addressee identification information to be output to the communication terminal is selected.

6. The communication system according to claim 1, wherein the communication terminal includes a selector that selects the addressee identification information displayed on the terminal side display, and a transmitter that transmits image data to an addressee indicated by the addressee identification information selected by the selector.

7. The communication system according to claim 6, wherein the computer-side store unit is capable of storing data of a mail address specifying an addressee of an electronic mail as the addressee identification information, and the transmitter transmits image data to an addressee specified by the mail address when the addressee identification information is the mail address.

8. The communication system according to claim 6, wherein the computer-side store unit is capable of storing data of a facsimile number specifying an addressee of a facsimile number as the addressee identification information, and the transmitter faxes image data to an addressee specified by the facsimile number when the addressee identification information is the facsimile number.

9. The communication system according to claim 1, wherein the communication terminal is capable of executing communication to an addressee, and the communication terminal includes a reader that reads address information registered on the basis of an electronic mail application program which is already in operation and a designating unit that designates the address information read by the reader as data of address information for the communication.

10. The communication system according to claim 1, wherein the address identification information includes character information and the retrieval information unit is operated by the operator so that character information is inputted.

11. A communication terminal having a function of specifying an addressee from addressee identification information to communicate with the specified addressee, a retrieval information input unit operated by an operator so that retrieval information relating the addressee identification information is inputted; an instruction unit instructing a computer at the communication terminal side to retrieve to the addressee identification information stored in a computer-side store unit in case of registration in the communication terminal of the addressee identification information used for communication so that the communication is executed according to a piece of addressee identification information selected from the retrieved addressee identification information, the instruction unit instructing the computer to fetch the addressee identification information based on the retrieval information supplied by an operator; and a terminal side display that displays the addressee identification information fetched by the computer so that the piece of addressee identification information is selected at the communication terminal side.

12. The communication terminal according to claim 11, which includes a selector that selects the addressee identification information displayed on the terminal side display, and a transmitter that transmits image data to an addressee indicated by the data of addressee identification information selected by the selector.

13. The communication terminal according to claim 12, wherein the computer-side store unit is capable of storing data of a mail address specifying an addressee of an electronic mail as the addressee identification information, and the transmitter transmits image data to an addressee specified by the mail address when the addressee identification information is the mail address.

14. The communication terminal according to claim 11, which includes a selector that selects the addressee identification information stored in the terminal-side store unit and at least one of the addressee identification information stored in the computer-side store unit, said one of the addressee identification information being the one fetched by the computer, and a transmitter that transmits image data to an addressee indicated by the addressee identification information selected by the selector.

15. A communication system, comprising;
a communication terminal having a function of specifying an addressee from addressee identification information to communicate with the specified addressee;
a computer transmitting addressee identification information to the communication terminal;
a computer-side store unit provided at a computer side that stores the addressee identification information;
a computer-side fetching unit provided at the computer side that fetches the addressee identification information from the computer-side store unit;
a computer-side output unit that outputs the fetched data of addressee identification information to the communication terminal in case of registration in the communication terminal of the addressee identification information used for communication so that the communication is executed according to a piece of addressee identification information selected from the fetched addressee identification information;
a retrieval information input unit operated by an operator for input of retrieval information relating the addressee identification information;
an instruction unit provided in the communication terminal so as to instruct the computer at the communication terminal side to retrieve via the computer-side fetching unit the data of addressee identification information stored in the computer-side store unit, the instruction unit instructing the computer to fetch the addressee identification information based on the retrieval information supplied by an operator; and
a terminal-side display that displays the data of addressee identification information outputted by the computer-side output unit so that the piece of addressee identification information is selected at the communication terminal side,
wherein the communication terminal includes a terminal-side input unit provided so that data of addressee identification information output is received in the communication terminal, and a terminal-side store unit that stores the addressee identification information supplied to the terminal-side input unit.

16. The communication system according to claim 15, wherein the communication terminal includes a terminal-side output unit that outputs the addressee identification information received by the terminal-side input unit, the computer includes a computer-side input unit, and the computer-side store unit stores the addressee identification information received by the computer-side input unit.

17. The communication system according to claim 15, wherein the computer includes a computer-side display provided at the computer side that displays fetched addressee identification information so that the addressee identification information to be output to the communication terminal is selected.

18. The communication system according to claim 15, wherein the communication terminal includes a selector that selects the addressee identification information displayed on the terminal side display and a transmitter that transmits image data to an addressee indicated by the addressee identification information selected by the selector.

19. The communication system according to claim 18, wherein the computer-side storage is capable of storing data of a mail address specifying an addressee of an electronic mail as the addressee identification information, and the transmitter transmits image data to an addressee specified by the mail address when the addressee identification information is the mail address.

20. The communication system according to claim 15, wherein the communication terminal includes a selector that selects the addressee information stored in the terminal-side store unit and at least one of the addressee identification information stored in the computer-side store unit, said one of the addressee identification information being the one fetched by the computer-side fetching unit, and a transmitter that transmits image data to an addressee indicated by the addressee identification information selected by the selector.

21. The communication system according to claim 20, wherein the computer-side store unit is capable of storing data of a facsimile number specifying an addressee of a facsimile number as the addressee identification information, and the transmitter faxes image data to an addressee specified by the facsimile number when the addressee identification information is the facsimile number.

22. A communication terminal having a function of specifying an addressee from the addressee identification information to communicate with the specified addressee; a retrieval information input unit operated by an operator for input of retrieval information relating addressee identification information; an instruction unit provided in the communication terminal for instructing a computer at the communication terminal side to retrieve the addressee identification information stored in the computer-side store unit in cases of registration in the communication terminal of the addressee identification information used for communication so that the communication is executed according to a piece of addressee identification information selected from the retrieved addressee identification information, the instruction unit instructing the computer to fetch the data of addressee identification information based on the retrieval information supplied by an operator; a terminal side display that displays the addressee identification information fetched by the computer so that the piece of addressee identification information is selected at the communication terminal side; and a terminal-side input unit provided so that the addressee identification information fetched by the computer is received in the communication terminal and a terminal-side store unit that stores the addressee identification information supplied to the terminal-side input unit.

23. The communication terminal according to claim 22, which includes a selector that selects the addressee identification information displayed on the terminal side display, and a transmitter that transmits image data to an addressee indicated by the addressee identification information selected by the selector.

24. The communication terminal according to claim 23, wherein the computer-side store unit is capable of storing data of a mail address specifying an addressee of an electronic mail as the addressee identification information, and the transmitter transmits image data to an addressee specified by the mail address when the addressee identification information is the mail address.

25. Communication terminal according to claim 22, which includes a selector that selects the addressee identification information stored in the terminal-side store unit and at least one of the addressee identification information stored in the computer-side store unit, said one of the addressee identification information being the one fetched by the computer, and a transmitter that transmits image data to an addressee indicated by the addressee identification information selected by the selector.

* * * * *